Figure 1:
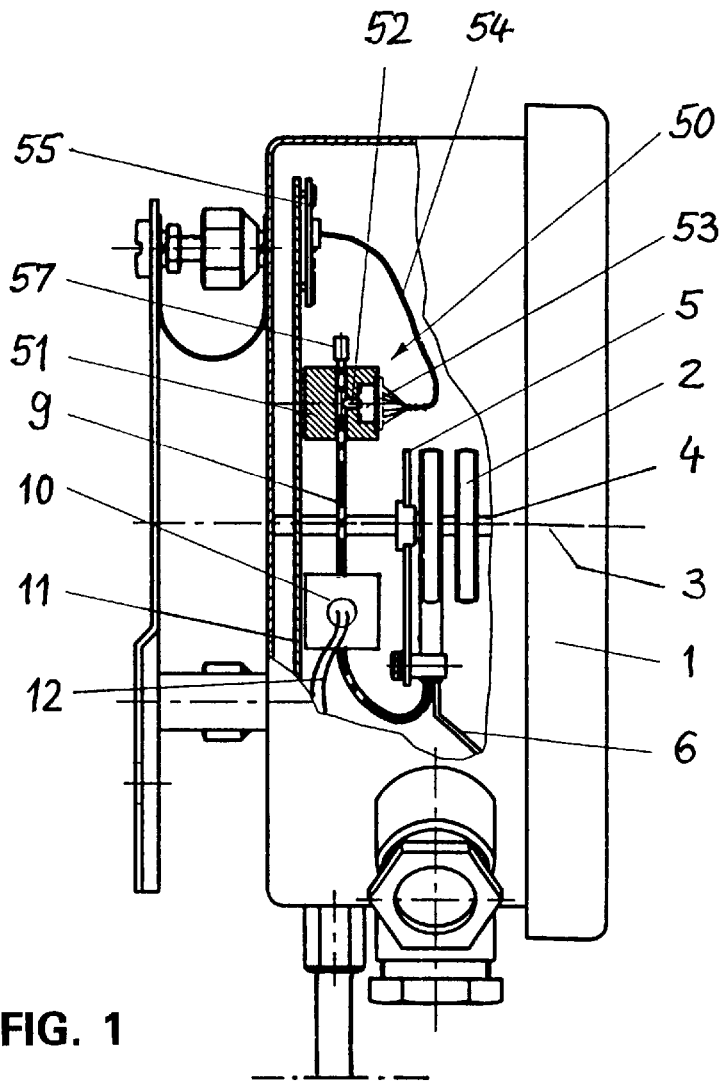

United States Patent [19]
Urich

[11] Patent Number: 6,086,249
[45] Date of Patent: Jul. 11, 2000

[54] METHOD AND APPARATUS FOR SIMULATING AND INDICATING THE TEMPERATURE OF THE WINDING OF AN ELECTRIC POWER TRANSFORMER

[76] Inventor: Manfred Urich, Anton-Bruckner-Strasse 3, D-61250 Usingen, Germany

[21] Appl. No.: 08/976,121

[22] Filed: Nov. 21, 1997

[30] Foreign Application Priority Data

Nov. 22, 1996 [DE] Germany .......................... 196 48 332

[51] Int. Cl.[7] .............................. G01K 1/08; G01K 5/00
[52] U.S. Cl. ........................ 374/152; 374/188; 374/197; 374/201
[58] Field of Search ................... 374/152, 188, 374/197, 201

[56] References Cited

U.S. PATENT DOCUMENTS

| | | | |
|---|---|---|---|
| 1,156,680 | 10/1915 | Fortescue | 374/152 |
| 1,615,684 | 1/1927 | Dann | 374/152 |
| 1,705,715 | 3/1929 | Clark | 374/152 |
| 1,818,785 | 8/1931 | Blume | 374/152 |
| 1,911,350 | 5/1933 | Clark | 374/152 |
| 1,917,163 | 7/1933 | Stephens et al. | 374/152 |
| 1,953,914 | 4/1934 | Camilli | 374/152 |
| 1,986,610 | 1/1935 | Stephens | 374/152 |
| 3,191,438 | 6/1965 | Meyrs | 374/203 |
| 3,403,558 | 10/1968 | Elliott | 374/188 |
| 3,410,141 | 11/1968 | Zurstadt | 374/203 |
| 3,875,800 | 4/1975 | Stockton | 374/203 |
| 4,336,713 | 6/1982 | Meyer | 374/197 |
| 5,816,708 | 10/1998 | Urich | 374/203 |

FOREIGN PATENT DOCUMENTS

| | | |
|---|---|---|
| 0 335 904 | 7/1993 | European Pat. Off. . |
| 513 604 | 11/1930 | Germany . |
| 89 11 078 | 1/1990 | Germany . |
| 561918 | 6/1944 | United Kingdom . |

*Primary Examiner*—Randy W. Gibson
*Attorney, Agent, or Firm*—Arent Fox Kintner Plotkin & Kahn

[57] ABSTRACT

The invention concerns a method to reproduce and display the winding temperature of an electric power transformer by deriving the measured and displayed temperature from the temperature of the coolant cooling the power transformer and the temperature of an electric heater fed with a current proportional to the load of the power transformer. A thermometer system is used for measuring the temperature and comprises of a hollow sensor element (7) and a mechanical transducer (2) connected through a capillary tube (6) with said element (7) to actuate a mechanical display and comprising several switches, the mutually connected cavities of sensor element (7), capillary tube (6) and transducer (2) subtending a closed pressure chamber filled with a test medium of which the pressure changes in relation to pressure. The temperature of the power transformer coolant is directly measured by the sensor element (7) and, by directly heating—separately from the measurement of the coolant temperature—the test medium using the electrical heater immersed into the test medium, an additional test pressure is generated that corresponds to the power-transformer's winding temperature. The electrical heater is mounted in an insulated heating chamber (10) which preferably is connected through a capillary tube (9) to the pressure chamber of the sensor element (7) and transducer (2).

9 Claims, 3 Drawing Sheets

U.S. Patent  Jul. 11, 2000  Sheet 1 of 3  6,086,249

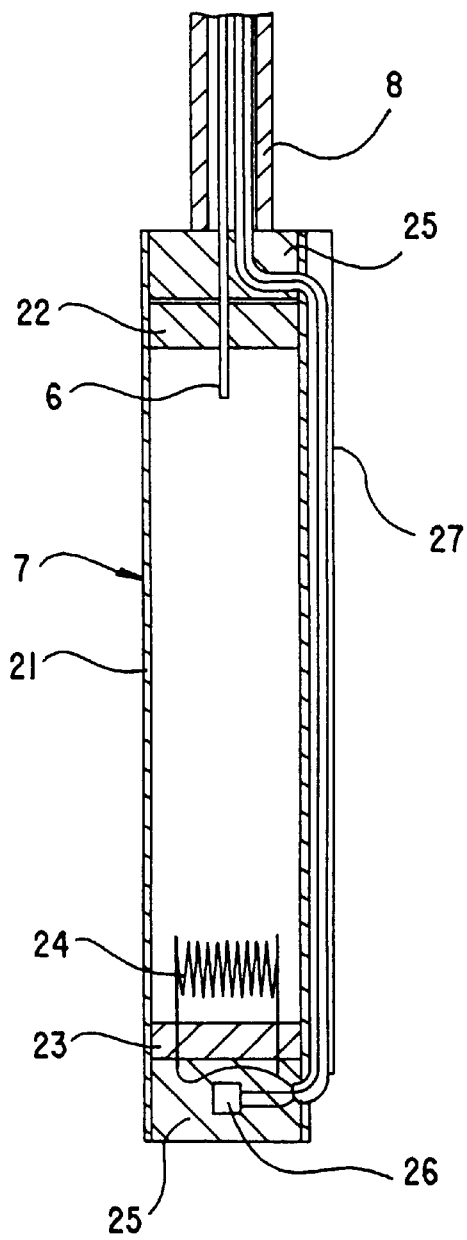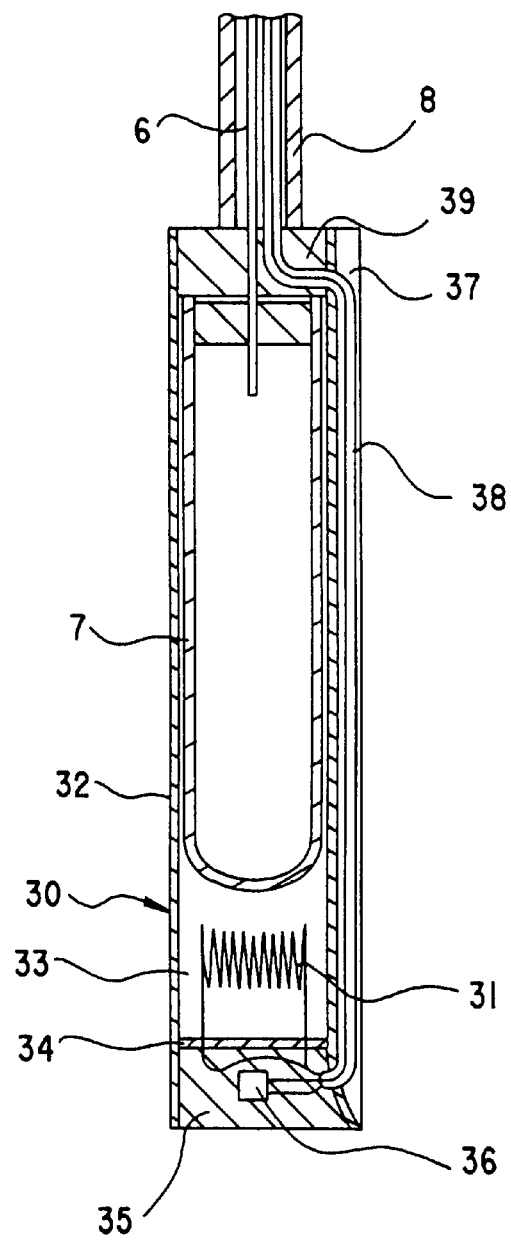

METHOD AND APPARATUS FOR SIMULATING AND INDICATING THE TEMPERATURE OF THE WINDING OF AN ELECTRIC POWER TRANSFORMER

The invention concerns a method for reproducing and displaying the winding temperature of an electric power transformer using a thermometer system fitted with a hollow sensor element, a mechanical transducer communicating through a capillary tube with the sensor element to actuate a mechanical display, and/or one or more switches, the communicating cavities of sensor element, capillary tube and transducer forming a closed pressure chamber filled with a test medium of which the pressure varies in relation to temperature, where, in said method, the temperature ascertained and displayed by the transducer is formed from the temperature of the coolant cooling the power transformer and from the temperature of an electrical heater fed with a current proportional to the load on the power transformer.

Procedures of the above species are known from the patent documents EP 0 335 904 B1 and DE 89 11 078 U. They allow reproducing the winding temperature of a power transformer corresponding to the particular transformer load. Transformer cooling can be controlled by means of said reproduced temperature and, when a maximum value is reached, the transformer can be shut off.

In the procedure known from the patent document DE 89 11 078 U1, a hollow sensor element is mounted inside an immersion cylinder to be integrated in a transformer tank filled with coolant, said sensor element being enclosed in an insulating tubing. The insulating tubing is wound with an electrical heating resistor in turn enclosed by insulating tubing. Using a current transformer, a current proportional to the power transformer load is made to pass through the heating resistor, the current amplitude being so matched to the heating resistor and the heat flow toward sensor element and coolant that the temperature measured by the sensor element corresponds to the particular average or maximum winding temperature of the power transformer. This known apparatus has been found practical. However it incurs the drawback that a comparatively large heating power is required for the heating resistor wire, and consequently the circuitry matching the heating power to the specific parameters of the power transformer also is comparatively complex and costly.

The object of the invention is to create a method of the initially cited kind which makes possible using, apparatus of simple design, to accurately and quickly reproduce the winding temperature of a power transformer.

This objective is achieved in that by means of the sensor element, the temperature of the transformer coolant is measured directly and that direct heating of the test medium, separate from the temperature measurement of the coolant, produces a test pressure corresponding to the winding temperature of the power transformer, said direct heating of the test medium being implemented by the electrical heater immersed in the test medium.

In the method of the invention, the heat transfer to the test medium required for reproducing the winding temperature is implemented through the coolant and the electrical heater in two different ways. The sensor element detects the coolant temperature of the power transformer and thereby generates in the test medium a base pressure corresponding to that temperature. By means of the separate heating of the test medium using the electrical heater of which the heat input is proportional to the power transformer load, the test medium pressure is increased by the amount corresponding to the particular temperature jump between coolant temperature and winding temperature. The method of the invention offers the advantage that the required heating power can be substantially reduced, the heat delivered by the heater being directly supplied to the test medium and heat losses being minimized by suitably insulating the heated chamber. Because of the slight heating power, the design relating to heating and to the electrical components of the associated current source also may be reduced. The method of the invention offers another advantage in that reproducing the temperature, and also matching the system to the travo-specific parameters can be implemented exclusively with passive components in the current supply to the heater. Nevertheless it is also feasible to integrate active circuitry into the system.

An especially advantageous thermometer system design with which to carry out the method of the invention relates to the electrical heater mounted in an insulated heating chamber preferably connected by a capillary tube to the pressure chamber common to the sensor element and transducer. In this design the heating chamber can be mounted in the thermometer-system housing receiving the temperature display and the mechanical transducer. In another advantageous embodiment of the invention, the heater may be mounted in the pressure chamber of the thermometric sensor element.

In order to make available—in addition to the local temperature display—a transmittable test signal reproducing the particular temperature value, the invention provides for an additional electrical transducer connected to the capillary tube and comprising a test chamber enclosed by a dimensionally stable housing, an electrical pressure sensing cell bounding the test chamber and an electrical test-value converter connected to the pressure sensing cell to generate a transmittable signal.

In order to circumvent the sealing required for the power supply when the heating resistors are mounted in the pressure chamber containing the test medium, the heater also may be mounted outside the pressure chamber, the configuration then appropriately being such that good heat transfer to the test medium is assured. Advantageously such a design may be that the heater shall be mounted in a chamber filled with a liquid heat transfer medium, said chamber directly adjoining the sensor element's pressure chamber from which it is separated by a partition.

Preferably the chamber is in the form of a cylinder closed at its axial end surfaces, the heater being mounted between the sensor element base and the cylinder base. In addition an electrical temperature sensor element may be mounted on the cylinder base. In another embodiment of the invention, the heater also may be mounted in a separate cylinder filled with a liquid, heat transfer medium and integrated jointly with the cylindrical sensor element into an immersion cylinder insertable into the thermometer pocket of a transformer, the remaining space in the immersion cylinder also being filled with a liquid heat transfer medium. To improve the heat transfer, the heater cylinder may be made to evince a cross-sectional sickle shape and it may partly enclose the cylindrical sensor element cylinder by the hollow-cylindrical segment of its wall surface. In this design as well an electric temperature sensor element may be additionally mounted in the heater cylinder.

The invention is elucidated below in relation to illustrative embodiments shown in the drawings.

Figure 2:
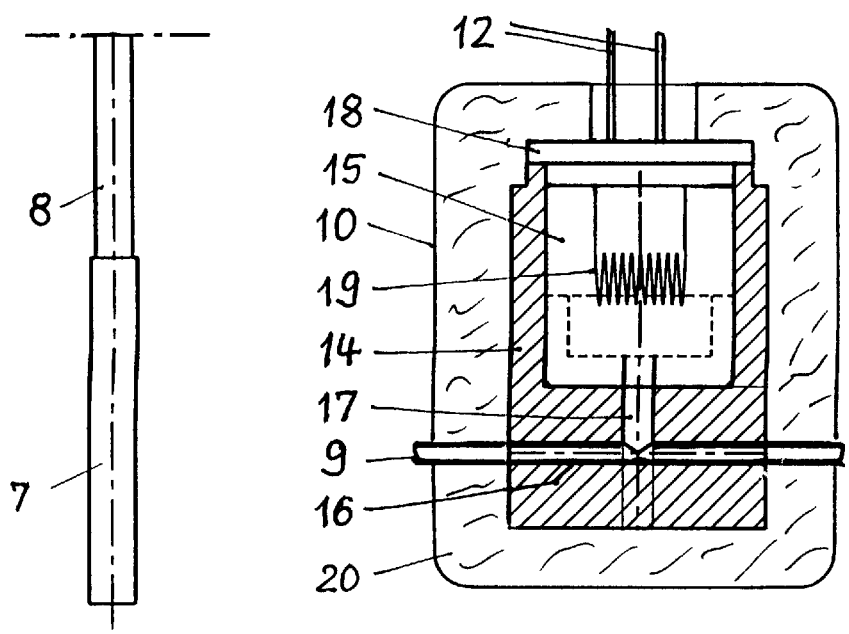
Figure 5:
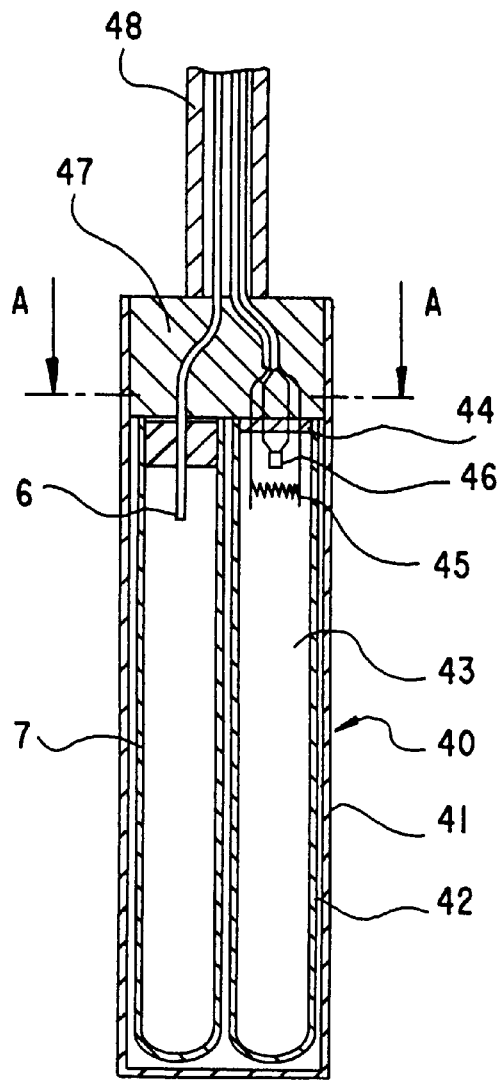
Figure 6:
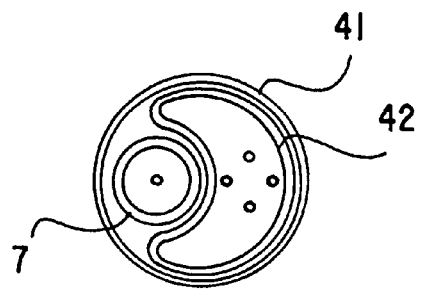

FIG. 1 is a side view in partial section of a thermometer system of the invention with a heater mounted in the thermometer-system housing, FIG. 2 is a cross-section of the heated heating chamber of a heated sensor element, FIG. 3 is a longitudinal section of a first embodiment of a heated sensor element, FIG. 4 is a longitudinal section of a second embodiment of a heated sensor element, FIG. 5 is a longitudinal section of a third embodiment of a heated sensor element, and FIG. 6 is a cross-section along line A—A of the sensor element of FIG. 5.

The thermometer system shown in FIG. 1 is composed of a pot-shaped housing 1 containing a mechanical transducer 2 in the form of a Bourdon tube and comprising a central axis 3, said transducer's displaceable end being connected by a spindle 4 to a rotatable pointer displaying the temperature and driving limit switches. The fixed end of the transducer 2 is held in a housing-affixed plate 5 and is connected by a capillary tube 6 to a sensor element 7. The sensor element 7 is mounted outside the housing 1 to the end of a flexible, tubular support element 8 passing the capillary tube 6. The sensor element 2 is connected by a further capillary tube 9 to an insulated heating chamber 10 affixed to a plate 11 in the housing 1. Electrical leads 12 connect the electrical heater mounted in the heating chamber 10 to an omitted terminal strip where the heater can be connected to a power supply.

As shown by FIG. 2, the heating chamber 10 comprises a metal housing 14 having a central borehole 15 in said chamber, a continuous borehole 16 running perpendicularly to said borehole 15 and a connecting borehole 17 by means of which said boreholes 15 and 16 communicate. The open end of the chamber borehole 15 is sealed pressure-tight by a stopper 18 having a glass feedthrough for the electrical lines and consisting of a temperature-resistant, electrically insulating material and holding an electrical heater 19 mounted in the chamber borehole 15 and connected to the power lines 12. A thermally insulating jacket 20 encloses the outside of the housing 14. The two segments of the capillary tube 9 are affixed in pressure-tight manner by soldering or welding into the continuous borehole 16. The two segments of the capillary tube 9 evince an aperture at the mouth of the connecting borehole 17.

The capillary tube 9 runs from the heating chamber 10 to an electric transducer 50. The end of the capillary tube 9 passes through a continuous borehole in the housing 51 of the transducer 50 inside which it is affixed in pressure-tight manner by soldering or welding. The capillary tube 9 is interrupted or fitted with an aperture inside said borehole to communicate with a housing borehole 52 branched perpendicularly to said continuous borehole, the end of said borehole 52 being sealed by a pressure measuring cell 53. The pressure measuring cell 53 is connected by electric leads 54 to a test-value transducer 55 which moreover may be fitted with electronic limit switches. The housing 51 and the test-value transducer 55 are jointly affixed to a plate 11 inside the housing 1. The free end 57 of the capillary tube 9 projecting from the housing 51 is tightly sealed by soldering or welding after the liquid medium generating a temperature-dependent change in pressure has been introduced.

To determine the winding temperature of a power transformer, the sensor element 7 of the above thermometer system is integrated into the thermometer pocket of the transformer tank and the electric heater 19 in the heating chamber 10 is connected to the current transformer of the power transformer. The heating current is matched to the specific transformer parameters by a circuit between the current transformer and the heater, said circuit illustratively being a resistance network and optionally containing an additional intermediate current transformer. In operation, the thermometer system displays a temperature resulting from the addition of the temperature of the sensor element 7 and the temperature in the heating chamber and reproducing the transformer winding temperature with the prescribed time constant on account of the heating chamber and the electrical heater.

FIG. 3 shows an embodiment of a thermometer system to reproduce the winding temperature of a transformer, wherein the electrical heater is located in the sensor element 7 which is inserted into the thermometer pocket of the transformer. The sensor element 7 in this case consists of a cylindrical tube 21 closed by a stopper 22 at its upper end. The end of the capillary tube 6 passes through a borehole in the stopper 22 to which it is joined in pressure-tight manner. The lower end of the tube 21 is sealed by a stopper 23 to which the electric heater 24 is affixed in electrically insulating manner. The ends of the tube 21 projecting beyond the stoppers 22, 23 are filled with a casting material 25. A temperature sensor element 26 is present in the cast material 25 at the lower end of the tube 21. The leads of the heater 24 and of the temperature sensor element 26 run as a cable 27 along the tube 21 and pass jointly with the capillary tube 6 through the flexible support element 8 into the thermometer housing. The test medium present in the tube 21 detects the transformer coolant temperature by means of the tube wall. At the same time the temperature of the test medium is raised to such an extent by the electrical heater in relation to the transformer load that depending on setting it corresponds to the average or maximum transformer winding temperature.

FIG. 4 is an illustrative design of an immersion cylinder 30 inserted into the transformer thermometer pocket wherein the electric heater 31 is mounted in a heating chamber 33 formed by the tube 32. The tube 32 is closed at its lower end by a lid 34 supporting the coils of the electric heater 31. A cavity formed underneath the lid 34 by the projecting tube end is filled with a casting a casting material 35 enclosing an electric temperature sensor element 36. The thermometer sensor element 7 formed by a cylinder is mounted in the tube 32 above the heater 31. The tube 32 is fitted longitudinally with a channel 37 formed by a bead to receive the leads of the heater 31 and of the temperature sensor element 36. The upper end of the tube 32 is sealed by a casting-material stopper 39 adjoined by a flexible protective tube enclosing the lead 38 and the capillary tube 6 running to the thermometer housing. A liquid electrically non-conducting heat transfer medium is present in the heating chamber 33 and encloses the sensor element 7 of which the diameter is less than the diameter of the tube 32. This configuration offers the advantage of allowing the use of an arbitrary spring thermometer.

FIG. 5 shows an immersion cylinder 40 for a thermometer system displaying transformer winding temperature and consisting of a cylindrical tube 41 wherein are mounted in juxtaposed manner a sensor element 7 and a heating chamber 43 composed of a separate tube 42. As shown by FIG. 6, the tube 42 evinces a sickle-shaped cross-section, partly enclosing the sensor element 7 by its concave cylindrical wall segment. The tube 42 is sealed at its upper end by a stopper 44 bearing an electric heater 45 and an electric temperature sensor element 46. The heating chamber 43 is filled with a liquid, electrically non-conducting heat transfer medium. Such a medium furthermore fills the remaining cavity in the tube 41. The tube 41 is sealed at its upper end with a stopper 47 made of an insulating casting material. The capillary tube 6 and the electrical leads of the heater 45 and of the temperature sensor element 46 pass through the stopper 47 and the adjoining protective tube 48 into the thermometer housing.

What is claimed is:

1. A method for reproducing and displaying the winding temperature of an electric power transformer using a thermometer system comprising a hollow sensor element, a mechanical transducer connected though a capillary tube with sensor element to actuate a mechanical display including at least one switch, said sensor element, capillary tube and transducer together forming a closed pressure chamber filled with a test medium having a pressure which changes in relation to temperature, comprising the steps of:

providing a heating chamber separate from and spaced apart from a container for the power transformer, immersing an electric heater in the test medium in the separate heating chamber, measuring the temperature of a coolant cooling the power transformer by directly positioning the sensor element in the coolant and ascertaining a pressure produced in the transducer, correcting the measured temperature by the electric heater fed with a current proportional to the load of the power transformer, wherein additional pressure corresponding to the winding temperature of the power transformer is produced, in a step separate from the direct measuring of transformer coolant temperature via the sensor element, by directly heating the test medium by the electric heater in said test medium and ascertaining and displaying the temperature by the total pressure of the test medium in the transducer.

2. Thermometer system for reproducing and displaying the winding temperature of an electric power transformer comprising:

a hollow sensor element, a mechanical transducer serving to actuate a mechanical display and at least one switch, a capillary tube connecting said mechanical transducer to the sensor element, the sensor element, capillary tube and transducer having mutually communicating cavities forming a closed pressure chamber filled with a test medium of which the pressure changes in relation to temperature, a heating chamber separate from the power transformer and connected through a separate capillary tube to the closed pressure chamber, an electric heater mounted in said separate heating chamber which can be loaded with a current proportional to the load of the power transformer, and a housing spaced apart from the sensor element wherein said transducer and said separate heating chamber with said electric heater are mounted in the housing.

3. Thermometer system as claimed in claim 2, wherein said separate heating chamber is thermally insulated.

4. Thermometer system as claimed in claim 2, further comprising an electric transducer connected to the capillary tube, said electric transducer comprising a measuring chamber enclosed by a dimensionally stable housing, an electric pressure sensing cell bounding the measuring chamber, and a test-value converter connected to said cell to generate a transmitted signal based upon pressure in said cell.

5. Thermometer system for reproducing and displaying the winding temperature of an electric power transformer comprising a hollow sensor element, a mechanical transducer serving to actuate a mechanical display and at least one switch, a capillary tube connecting said mechanical transducer to the sensor element, the sensor element, capillary tube and transducer having mutually communicating cavities forming a closed pressure chamber filled with a test medium of which the pressure changes in relation to temperature, an electric heater mounted in said hollow sensor element which can be loaded with a current proportional to the load of the power transformer, a cylinder closed at its ends wherein the sensor pressure chamber comprises a cylindrical member received in the cylinder, the electric heater being mounted between a base surface of the sensor element and a base of the cylinder, and an electric temperature sensor element mounted on the cylinder.

6. Thermometer system as claimed in claim 5, further comprising an electric temperature sensor element mounted on the separate heating chamber.

7. Thermometer system as claimed in claim 5, further comprising an electric temperature sensor element mounted in the heating chamber.

8. Thermometer system as claimed in one of claims 2, 5, or 6, wherein said separate heating chamber comprises a heater cylinder, said heater being mounted therein, said separate heating cylinder being filled with a liquid heat transfer medium, and said system further comprises an immersion cylinder containing said separate heating cylinder together with the hollow sensor element and being inserted into a thermometer pocket of the power transformer, any remaining cavity in the immersion cylinder being filled with a liquid heat transfer medium.

9. Thermometer system as claimed in claim 8, wherein said separate heating cylinder is cross-sectionally sickle-shaped and partly encloses the hollow sensor element by a hollow-cylindrical segment of a wall surface thereof.

* * * * *

UNITED STATES PATENT AND TRADEMARK OFFICE
CERTIFICATE OF CORRECTION

PATENT NO. : 6,086,249

DATED : July 11, 2000

INVENTOR(S) : URICH

It is certified that error appears in the above-identified patent and that said Letters Patent is hereby corrected as shown below:

Please insert,MESSKO ALBERT HAUSER GmbH & Co. KG. GABLONZER
STRASSE 25-27 D-61440 OBERURSEL, GERMANY WITH CODE 73 ON THE
COVER SHEET.

Signed and Sealed this

Twenty-second Day of May, 2001

*Attest:*

NICHOLAS P. GODICI

*Attesting Officer*     *Acting Director of the United States Patent and Trademark Office*